United States Patent Office 3,532,687
Patented Oct. 6, 1970

---

1

3,532,687
TETRAHALOGENO ISOINDOLINE PIGMENTS
André Pugin, Riehen, Kurt E. Burdeska, Basel, and Alfred Staub, Binningen, Basel-Land, Switzerland, assignors to J. R. Geigy A.G., Basel, Switzerland
No Drawing. Continuation-in-part of application Ser. No. 451,606, Apr. 28, 1965. This application Mar. 22, 1968, Ser. No. 715,172
Int. Cl. C07d 27/48
U.S. Cl. 260—239.6       3 Claims

---

ABSTRACT OF THE DISCLOSURE

The invention is directed to pigments of the formula

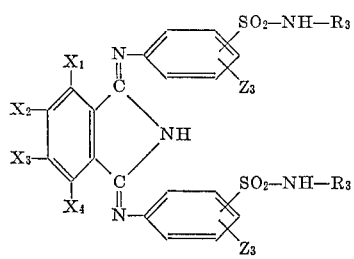

wherein
each of $X_1$, $X_2$, $X_3$ and $X_4$ is a member selected from the group consisting of chlorine and bromine,
$R_3$ is a member selected from the group consisting of hydrogen, lower alkyl and hydroxy-lower alkyl, and
$Z_3$ is a member selected from the group consisting of hydrogen, chlorine, bromine, lower alkyl and lower alkoxy, useful for coloring high molecular weight organic materials; the pigmented materials are distinguished by good resistance to solvents and fastness to cross lacquering and migration.

---

This application is a continuation-in-part of our pending patent application Ser. No. 451,606, filed Apr. 28, 1965, now U.S. Pat. No. 3,385,864.

The present invention concerns new pigments useful for coloring high molecular organic products. The invention also concerns, as industrial products, the colored high molecular, organic material.

"High molecular organic substances" which can be pigmented acording to the invention and which are understood by this term as used in this specification, can be of natural or synthetic origin and are, in particular, natural resins, drying oils or rubber, furthermore modified natural substances, e.g. chlorinated rubber, oil-modified alkyd resins or cellulose derivates such as viscose, acetyl cellulose and nitrocellulose and, particularly, completely synthetic organic polymeric materials, i.e. plastics produced by polymerization, polycondensation and polyaddition. The following can be named in particular from this class of plastics: polyethylene, polypropylene, polystyrene, polyvinyl chloride, polyvinyl acetate, polyacrylonitrile, polyacrylic acid ester and polymethacrylic acid ester; polyesters, in particular high molecular esters of aromatic polycarboxylic acids with polyfunctional alcohols; polyamides; the condensation products of formaldehyde with phenols, the phenolic resins, and the condensation products of formaldehyde with urea, thiourea and melamine, the so-called amino-plastics; the polyesters used as lacquer resins, both saturated such as alkyd resins as well as unsaturated such as maleinate resins, and also the polyaddition or polycondensation products of epichlorohydrin with diols or polyphenols known by the name of "epoxy resins"; in addition the so-called thermoplastics, i.e. polymeric materials which cannot be cured. Not only the uniform compounds but also mixtures of polymeric materials as well as mixed condensates and mixed polymers such as those based on butadiene can be pigmented according to the invention.

The pigmenting of such high molecular organic substances with 1,3-bis-arylimino-isoindolines the arylimino groups of which are derived from certain heterocyclic amines namely benzothiazoles, benzoxazoles and benzimidazoles, is known. But the color strength and the fastness properties of these pigmentings, in particular the fastness to solvents, cross lacquering, migration and light are not up to present day standards. Also these 1,3-bis-aryl-iminoisoindolines having a heterocyclic aryl radical have the disadvantage that on trituration with zinc oxide they undergo a noticeable change in shade which change is proportional to the length of the trituration. These undesirable properties are also present in the case of using pigments obtained from those of the above-mentioned class by halogenation in the 4-, 5-, 6- and 7-position of the isoindoline ring.

Furthermore, it has been found that the 1,3-bis-phenyl-imino-isoindolines used as intermediate products for the synthesis of phthalocyanine dyestuffs, the benzo radical of the isoindoline ring of which is unsubstituted, suffer from drawbacks which make them unsuited as pigments; in particular they lack fastness to light and solvents and possess only slight color strength, even if the phenylimino groups thereof bear non-ionogenic ring substituents. Their color strength is even lower than that of the 1,3-bis-arylimino-iso-indolines containing heterocyclic arylimino groups.

It could be concluded from these facts that the pigmentings of high molecular organic substances with 4,5,6,7-tetrahalogen-1,3-bis-phenylimino-isoindolines the phenyl radicals of which are neither non-ionogenically substituted nor condensed, would have hardly better properties than pigmentings with such compounds the benzo radical of the isoindoline ring of which is not halogenated.

It has now been found that contrary to this expectation high molecular organic products can be pigmented with surprising fastness and color strength by incorporating into the same a colored compound of the formula.

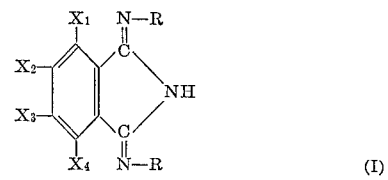
(I)

wherein each of $X_1$, $X_2$, $X_3$ and $X_4$ represents chlorine or bromine and R represents an unsubstituted, a non-ionogenically substituted or a condensed phenyl radical.

The tautomeric Formula Ia can also be assigned to the compounds of the Formula I and all formulae analogous to Formula I are to be understood as including the tautomers analogous to Formula Ia:

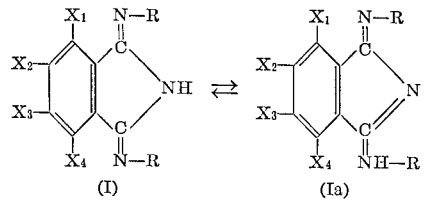

If R in Formula I is a non-ionogenically substituted phenyl radical then examples of substituents are: halogens such as fluorine, chlorine or bromine; lower alkyl groups such as the methyl, ethyl or butyl group; aryl groups such as the phenyl group and non-ionogenically substituted phenyl groups; lower alkoxy groups, e.g. the methoxy, ethoxy or butoxy group; aralkoxy groups such as the benzyloxy group; or aryloxy groups such as the phenoxy, methylphenoxy or halogenphenoxy groups; sulphonic acid amide and carboxylic acid amide groups optionally substituted at the nitrogen atom, which nitrogen substituents may be aliphatic groups, in particular lower alkyl, hydroxyalkyl, halogenalkyl or cyanoalkyl groups, cycloaliphatic, araliphatic or aromatic groups; also sulfonic acid aryl ester, particularly phenyl ester or cresyl ester groups; carboxylic acid ester groups; acyl groups, i.e. carbacyl groups, e.g. lower alkanoyl groups such as the acetyl or propionyl group, aroyl groups such as the benzoyl, methylbenzoyl and chlorobenzoyl groups; alkylsulfonyl groups such as the methylsulfonyl, ethylsulfonyl or butylsulfonyl group, or arylsulfonyl groups such the phenylsulfonyl, methylphenylsulfonyl or chlorophenylsulfonyl group; acylamido, particularly carbacylamido, alkoxycarbonylamido, cycloalkoxycarbonylamido, aralkoxycarbonylamido or optionally nitrogen-substiuted carbamoylamido groups or dicarboxylic acid imido groups and, finally, the cyano or trifluoromethyl group. Mainly, aroylamido groups are used as carbacylamido groups, i.e. for example, benzoylamido or naphthoyl-(1 or 2)-amido groups the rings of which can be non-ionogenically substituted, e.g. by halogen, lower alkyl or lower alkoxy groups. The methoxy- and ethoxycarbonylamido groups are mentioned as alkoxycarbonylamido groups, the cyclohexyloxycarbonylamido group is mentioned as cycloalkoxycarbonylamido group and, as example of aralkoxycarbonylamido groups, the benzyloxycarbonylamido group is mentioned. Nitrogen-substituted carbamoylamido groups preferably correspond to the formula —HN—CO—NH—R' wherein R' is an aromatic group, mainly a phenyl radical optionally substituted by halogen, lower alkoxy or alkyl groups. Dicarboxylic acid imido groups are derived from e.g. succinic acid, phthalic acid, chlorinated phthalic acid, hexahydrophthalic acid, 1,4-endomethylene-hexahydrophthalic acid, naphthalic acid or from pyridine dicarboxylic acid.

If R is a condensed phenyl radical, then the aminobenzo component can complete both carbocyclic as well as heterocyclic structures.

Preferably both R's are identical non-ionogenically substituted phenyl radicals. The expression "non-ionogenically substituted," whenever appearing in the invention description is used to designate that compounds or radicals are substituted by groups which do not dissociate acid in neutral water.

Isoindoline pigments according to the invention, the pigmentings of which, especially lacquers, show exceptionally good resistance to solvents and fastness to cross lacquering and migration are those falling under Formula I in which R represents a sulfamoylphenyl radical of the formula

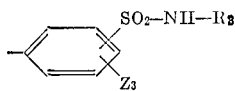

wherein $R_3$ represents hydrogen, lower alkyl or hydroxy-lower alkyl, $Z_3$ represents hydrogen, chlorine, bromine, lower alkyl or lower alkoxy.

4,5,6,7-tetrahalogen-isoindolines usable according to the invention and falling under Formula I wherein R is a non-ionogenically substituted or condensed phenyl radical and $X_1$, $X_2$, $X_3$ and $X_4$ each represents chlorine or bromine, are obtained by reacting a compound of the formula

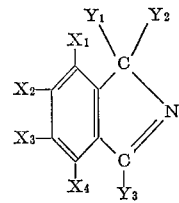

(II)

wherein each of $Y_1$, $Y_2$ and $Y_3$ represents a monovalent reactive substituent and $Y_1$ and $Y_2$ together also represent a divalent reactive substituent and $X_1$, $X_2$ $X_3$ and $X_4$ have the meanings given in Formula I, with two equivalents of a non-ionogenically substituted or condensed primary phenylamine.

As monovalent reactive substituents, $Y_1$, $Y_2$ and $Y_3$ each preferably represents chlorine, an esterified hydroxy group for instance, an alkoxy group such as methoxy or ethoxy group or an aryloxy group, such as phenoxy, methylphenoxy or chlorophenoxy group, or a tertiary amino group, in which case, preferably the morpholino group.

If $Y_1$ and $Y_2$ together represent a divalent reactive substituent then this is preferably an imino group of the formula =N—R'; in this case $Y_3$ is advantageously an amino group of the formula —NH—R'. In these formulae, R' represents hydrogen or an alkyl group optionally containing non-ionogenic substituents, e.g. the methyl, ethyl, butyl, γ-methoxypropyl or β-hydroxyethyl group; preferably R' is hydrogen. As indicated above, isoindolines of this type can occur in tautomeric form; the tautomeric structures are also embraced by the drawing of a structural formula.

Starting materials of Formula II wherein $Y_1$, $Y_2$ and $Y_3$ each represents chlorine are obtained by reacting tetrachloro- or tetrabromophthalimide with phosphorus pentachloride; if tetrabromophthalimide is used, then individual bromine atoms can be exchanged for chlorine atoms. By reacting this 1,3,3-trichloro-isoindoline compound of Formula II with an alkali metal alcoholate or phenolate or with a secondary amine, starting materials of the Formula II are obtained wherein $Y_1$, $Y_2$ and $Y_3$ each represent an etherified hydroxy group or tertiary amino group. If a 1,3,3-trichloro-isoindoline compound of Formula II is reacted with an amine of the formula R'—NH₂, then starting materials of Formula II are obtained wherein $Y_1$ and $Y_2$ together represent the imino group of the formula =N—R' and $Y_3$ represents the amino group of the formula —NH—R'.

The reaction of non-ionogenically substituted or condensed primary phenylamines with a compound of Formula II, wherein each of $Y_1$, $Y_2$ and $Y_3$ is chlorine, is preferably performed by heating the two starting substances, in the absence of compounds containing hydroxyl groups, advantageously to temperatures of 50 to 250° C., whereby generally the hydrogen chloride which is split off is released from the reaction mixture. Advantageously the reaction partners are reacted in an inert solvent, e.g. in an optionally halogenated or nitrated hydrocarbon. Instead of allowing the hydrogen chloride to escape, it can be bound with suitable acid binding agents, e.g. by means of an excess of the phenylamine to be reacted or by means of a tertiary amine such as triethylamine, N,N-diethyl-aniline or pyridine; in this case the reaction can be performed at room temperature. The word "low" as used in this specification and in the appended claims in connection with "alkyl" and "alkoxy" means that those radicals have from 1 to 5 carbon atoms, in connection with "alkanoyl" it means a radical of from 2 to 5 carbon atoms.

The reaction of a non-ionogenically substituted or condensed primary phenylamine with a compound of Formula II wherein $Y_1$ and $Y_2$ together are =N—R', preferably =NH, and $Y_3$ is —NH—R', especially —NH₂, is advantageously performed by heating the reaction partners in an organic solvent. As organic solvents, optionally halogenated or nitrated aromatic hydrocarbons, higher boiling alcohols, e.g. benzyl alcohol or ethylene glycol and its monoether can be used; particularly suitable solvents are fatty acids such as glacial acetic acid.

Compounds of Formula II wherein each of $Y_1$, $Y_2$ and $Y_3$ is an etherified hydroxy group or tertiary amino group are advantageously reacted with the non-ionogenically substituted or condensed phenylamine in the presence of an organic acid, especially in acetic acid. This reaction occurs even in water.

In all these modifications of the process, the crude pigments generally precipitate while the reaction mixture is hot and, by filtering off and, optionally, by washing with organic solvents, they can be isolated in a pure form suitable for analysis.

In general, the pigments usable according to the invention have good texture and in most cases can be used as crude products. If necessary or desirable, the crude products can be converted by milling or kneading into a finely dispersed form. For this purpose, advantageously milling auxiliaries are used such as inorganic and/or organic salts in the presence or absence of organic solvents. Often, an improvement of the properties can also be attained by heating the crude pigments in hot organic solvents. After milling, the auxiliaries are removed in the usual way, soluble inorganic salts, e.g. with water, and water-insoluble organic auxiliaries, e.g. by steam distillation.

Pigments usable according to the invention are particularly suitable for the colouring of vinyl, polyolefin and styrene polymers such as polymeric materials, and so-called film formers or binders known as crude materials for lacquers, particularly linseed oil varnish, nitrocellulose, alkyd resins, melamine resins and urea-formaldehyde resins. The high molecular organic substances are pigmented with the pigments of Formula I, for example, by mixing such a pigment, optionally in the form of master batches, with these substrata using sets of mixing rollers, mixing or milling apparatus. The pigmented material is then made into the desired final form by the usual known processes such as calendering, pressing, extrusion, spreading, pouring or injection moulding. To produce non-rigid articles or to reduce their brittleness, it is often desirable to incorporate so-called plasticisers into the high molecular compounds before forming. Esters of phosphoric acid, phthalic acid or sebacic acid, for example, can serve as such. The plasticiser can be incorporated into the polymeric materials before or after incorporation of the pigment dyestuff in the process according to the invention. To attain various shades, it is also possible to add fillers or other colour-imparting components such as white, coloured or black pigments, in any amounts desired, to the high molecular organic substances in addition to the compounds of Formula I.

To pigment lacquers and printing inks, the high molecular organic materials and the compounds of Formula I, optionally together with additives such as fillers, other pigments, siccatives or plasticisers, are finely dispersed or dissolved in a common organic solvent or mixture of solvents. This can be done by dispersing or dissolving the individual components separately or dispersing or dissolving several of them together and then bringing all components together.

High molecular organic materials pigmented according to the invention generally contain amounts of 0.001 to 30% by weight of a compound of Formula I, calculated on the high molecular organic substances to be pigmented; polymeric materials and lacquers preferably contain 0.1 to 5% by weight, printing inks preferably contain 10 to 30% by weight. The amount of pigment to be chosen depends in the first place on the desired colour strength, then on the thickness of the article and finally, on any content of white pigment there may be in the polymeric material.

High molecular organic substances pigmented according to the invention have very fast yellow shades; also the fastness properties in use are generally very good.

The following non-limitative examples illustrate the invention further. The temperatures are given therein in degrees centigrade. Percentages are given by weight unless expressly stated otherwise.

EXAMPLE 1

5.1 g. of 1,3,3-trimorpholino-4,5,6,7-tetrachloroisoindolenine and 4.13 g. of 4-chloro-3-aminobenzene sulphonic acid amide are boiled for 3 minutes in 100 g. of glacial acetic acid. The precipitated yellow dyestuff is filtered off while still hot, washed with ethanol and acetone and dried. 6.4 g. of a yellow pigment of the formula given below are so obtained. The pigment have very good fastness to cross lacquering and light and good fastness to migration.

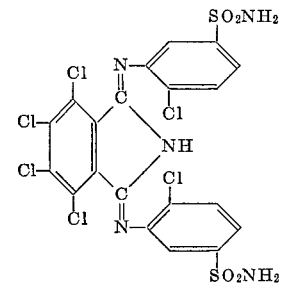

The 1,3,3-trimorpholino - 4,5,6,7 - tetrachloroisoindolenine is produced by reacting 1,3,3,4,5,6,7-heptachloroisoindolenine with morpholine in benzene. It melts at 180°.

If the 4.13 g. of 4-chloro-3-aminobenzene sulphonic acid amide are replaced by equimolar amounts of one of the amines given in the following table, column II, then, with otherwise the same procedure, similar fast pigments are obtained which have the shades given in column III.

TABLE

| I | II | III |
|---|---|---|
| Expl. No. | Amine | Shade of print on paper |
| 2 | $H_2N-\langle\;\rangle-SO_2NH_2$ | Yellow. |
| 3 | $H_2N-\langle\;\rangle-SO_2NH-CH_3$ | Do. |
| 4 | $H_2N-\langle\;\rangle-SO_2NH-C_2H_5$ | Do. |
| 5 | $H_2N-\langle\;\rangle-Cl$ with $SO_2NH-CH_3$ | Do. |
| 6 | $H_2N-\langle\;\rangle-CH_3$ with $SO_2NH_2$ | Do. |
| 7 | $H_2N-\langle\;\rangle-OCH_3$ with $SO_2NH_2$ | Do. |
| 8 | $H_2N-\langle\;\rangle-SO_2-NH-CH_2-CH_2-OH$ | Do. |
| 9 | $H_2N-\langle\;\rangle-Br$ with $SO_2NH-CH_3$ | Do. |

EXAMPLE 10

15 g. of a collodion wool having a 35% content of butanol, 15 g. of a phthalate resin modified with castor oil, 15 g. of a 70% butanolic solution of a urea resin lacquer, 20 g. of butyl acetate, 10 g. of glycol monoethyl ether, 20 g. of toluene and 5 g. of alcohol are made up into a lacquer. This lacquer is then pigmented with 2 g. of 1,3-bis-(2'-chloro-5'-sulphamoyl-phenyl-imino)-4,5,6,7-tetrachloroisoidoline (produced according to Example 1) and 2 g. of titanium dioxide (Rutile) and milled. After spraying the lacquer onto cardboard and drying, a yellow coating is obtained which has very good fastness to light and cross lacquering.

We claim:

1. A pigment of the formula

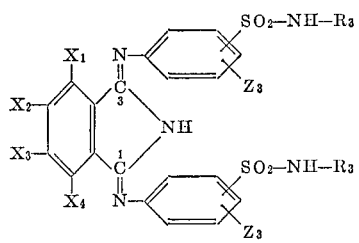

wherein
each of $X_1$, $X_2$, $X_3$ and $X_4$ is a member selected from the group consisting of chlorine and bromine,
$R_3$ is a member selected from the group consisting of hydrogen, lower alkyl and hydroxylower alkyl, and
$Z_3$ is a member selected from the group consisting of hydrogen, chlorine, bromine, lower alkyl and lower alkoxy.

2. 4,5,6,7-tetrachloroisoindoline in which each of the carbon atoms in 1- and 3-position is substituted by the grouping

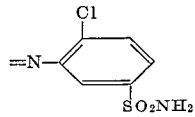

3. 4,5,6,7-tetrachloroisoindoline in which each of the carbon atoms in 1- and 3-position is substituted by the grouping

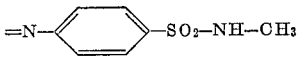

References Cited

UNITED STATES PATENTS 2,739,151   3/1956   Rosch et al. _____ 260—326.1 XR

ALEX MAZEL, Primary Examiner

J. A. NARCAVAGE, Assistant Examiner

U.S. Cl. X.R.

106—23; 260—37, 38, 39, 40, 41, 295, 326.1, 764